United States Patent  
Cyllik et al.

(10) Patent No.: US 11,173,757 B2
(45) Date of Patent: Nov. 16, 2021

(54) METHOD FOR ASSIGNING TYRE-SENSOR MODULES TO A TRAILER VEHICLE OF AN ASSOCIATED UTILITY VEHICLE COMBINATION

(71) Applicant: Continental Reifen Deutschland GmbH, Hannover (DE)

(72) Inventors: Adrian Cyllik, Hannover (DE); Jörg Hanna, Rödinghausen (DE); Andreas Scher, Burgdorf (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 16/855,009

(22) Filed: Apr. 22, 2020

(65) Prior Publication Data

US 2020/0331309 A1   Oct. 22, 2020

Related U.S. Application Data

(63) Continuation of application No. 16/341,927, filed as application No. PCT/EP2017/074569 on Sep. 28, 2017, now Pat. No. 10,717,330.

(30) Foreign Application Priority Data

Nov. 1, 2016   (DE) .................... 10 2016 221 430.6

(51) Int. Cl.
*B60C 23/04* (2006.01)
*B60C 23/00* (2006.01)
(52) U.S. Cl.
CPC ........ *B60C 23/0416* (2013.01); *B60C 23/009* (2013.01)
(58) Field of Classification Search
CPC ..................... B60C 23/0416; B60C 23/009
(Continued)

(56) References Cited

U.S. PATENT DOCUMENTS 7,026,922 B1 * 4/2006 Talukder .............. B60C 23/009
                                                    340/442
7,506,540 B1 * 3/2009 Job ..................... B60C 23/0416
                                                    73/146.5
(Continued)

FOREIGN PATENT DOCUMENTS

DE   102008032920 A1   1/2010
DE   102008033844 A1   1/2010
(Continued)

*Primary Examiner* — Kerri L McNally
(74) *Attorney, Agent, or Firm* — Gregory Adams; David L. Cate

(57) ABSTRACT

The invention relates to a method for associating tire sensor modules (6.$i$) with a trailer vehicle (3), having at least the following steps:
  capturing data messages (S1) from tire sensor modules (6.$i$, 106.$i$, 206.$i$) in a monitoring region (8);
  associating the captured data messages (S1) with a tire sensor module (6.$i$, 106.$i$, 206.$i$);
  ascertaining a number of captured data messages (S1) for each detected tire sensor module;
  rating the captured data messages (S1) to establish whether the tire sensor modules (6.$i$, 106.$i$, 206.$i$) received in total up to then belong to the driver's own trailer vehicle (3) or to the adjacent trailer vehicle (103, 203);
  accepting the tire sensor modules (6.$i$) detected in the rating as affiliated to the driver's own trailer vehicle (3).
According to the invention, each tire sensor module (6.$i$, 106.$i$, 206.$i$) detects a wheel position associated with the respective tire sensor module (6.$i$, 106.$i$, 206.$i$) and a trailer axle configuration, so that for an accepted tire sensor module (6.$i$) the wheel position and the trailer axle configuration can be taken as a basis for making a positional association on the driver's own trailer vehicle (3).

18 Claims, 5 Drawing Sheets

(58) Field of Classification Search
USPC .......................................................... 340/445
See application file for complete search history.

(56) References Cited

U.S. PATENT DOCUMENTS

| | | | |
|---|---|---|---|
| 2003/0048178 A1 | 3/2003 | Bonardi et al. | |
| 2003/0080860 A1* | 5/2003 | Stewart | B60C 23/0437 340/442 |
| 2005/0179530 A1* | 8/2005 | Stewart | B60C 23/0416 340/447 |
| 2007/0018804 A1 | 1/2007 | Strache et al. | |
| 2008/0059029 A1* | 3/2008 | Costes | B60C 23/0416 701/49 |
| 2008/0154560 A1 | 6/2008 | Fink et al. | |
| 2010/0191409 A1* | 7/2010 | Weston | B60C 23/009 701/29.6 |
| 2011/0209536 A1* | 9/2011 | Craig | B60C 23/0488 73/146 |
| 2011/0308310 A1* | 12/2011 | Strahan | B60C 23/0416 73/146.5 |
| 2011/0313611 A1* | 12/2011 | An | B60C 23/0416 701/34.4 |
| 2012/0029767 A1* | 2/2012 | Bailie | B60C 23/0416 701/36 |
| 2014/0073260 A1 | 3/2014 | Bettecken | |
| 2015/0239306 A1 | 8/2015 | Bracq et al. | |
| 2015/0352912 A1 | 12/2015 | Lehmann et al. | |
| 2016/0236523 A1 | 8/2016 | Moreau | |
| 2016/0258830 A1* | 9/2016 | Lammers | B60C 23/044 |

FOREIGN PATENT DOCUMENTS

| | | |
|---|---|---|
| DE | 102010062058 A1 | 5/2012 |
| DE | 102013101619 A1 | 8/2014 |
| DE | 10243441 A1 | 9/2014 |
| WO | 2013190189 A1 | 12/2013 |
| WO | 2015052439 A1 | 4/2015 |

* cited by examiner

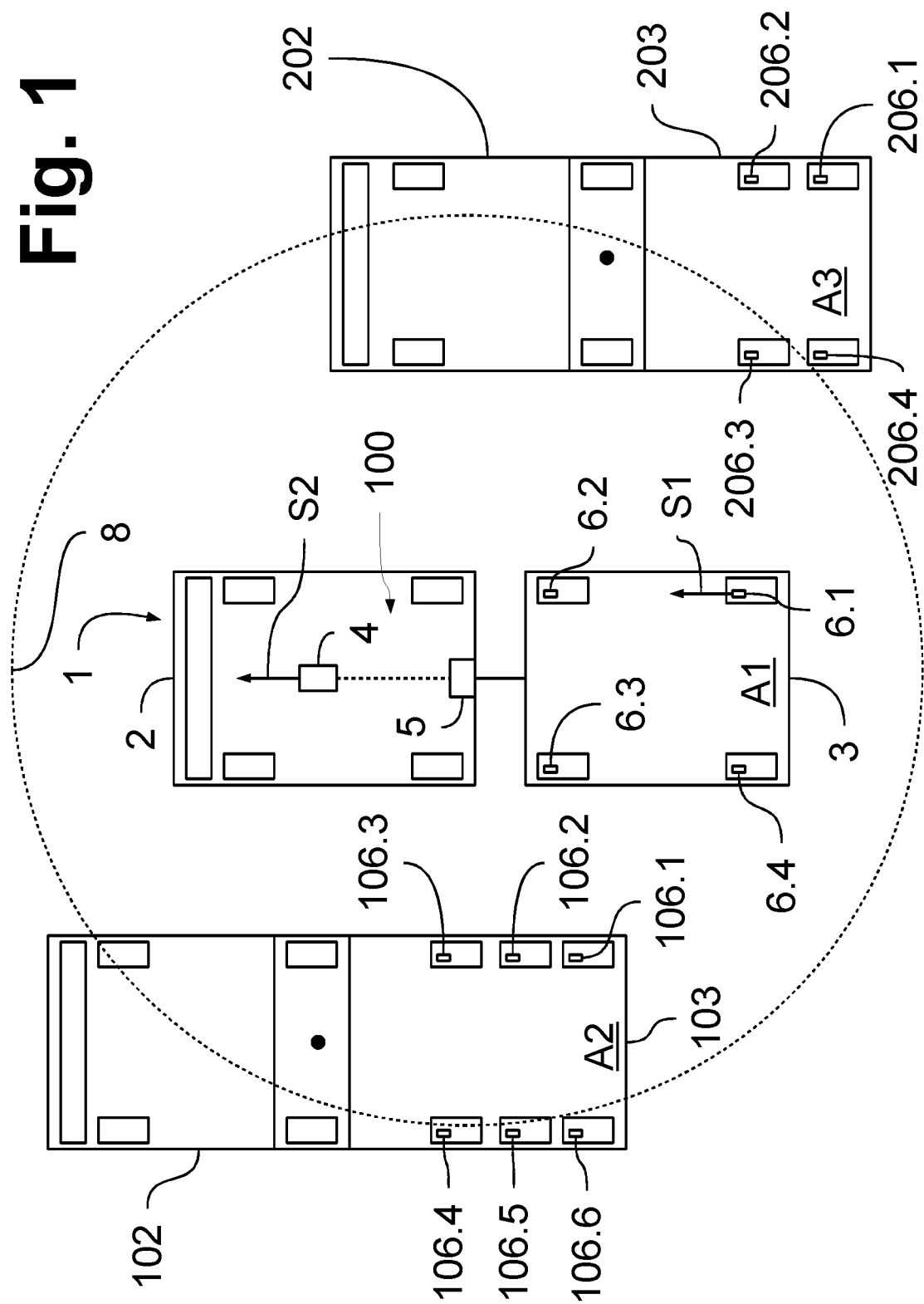

METHOD FOR ASSIGNING TYRE-SENSOR MODULES TO A TRAILER VEHICLE OF AN ASSOCIATED UTILITY VEHICLE COMBINATION

BRIEF SUMMARY OF THE INVENTION

The invention relates to a method for associating tire sensor modules with a trailer vehicle of a driver's own commercial-vehicle/trailer.

Tire sensor modules or transponders, which are arranged, for example, in the interior of a tire, are known for the purpose of monitoring tire states, in particular a tire pressure, of tires of a commercial vehicle. Such tire sensor modules are designed to capture a tire pressure, mechanical stress states in the tire and a tire temperature on the basis of a fixed position, to process them and to transmit them by radio-frequency (RF) radio signal to an electronic control unit (ECU) of a monitoring system using a data message. The control unit receives the data message via a receiving module of the monitoring system and, on the basis of limit values, outputs a status signal to the driver, for example if it has been established that there is a tire pressure below a limit value at one of the tires. DE 102 43 441 A1 discloses an example of such a tire sensor module. Furthermore, a tire sensor module can use the data message to transmit a tire sensor module state to the control unit, for example a sensor fault or the presence of a loose tire sensor module, and said tire sensor module state can be output to the driver using the status signal.

When the tires of a two-part commercial vehicle or commercial-vehicle/trailer combination comprising a towing vehicle and a trailer vehicle, that is to say a semi-trailer or trailer, are monitored, the tire sensor modules of the towing vehicle are already stored in advance in the control unit by means of a sensor identifier or a sensor identification, the respective tire sensor module being uniquely associated with a tire of the towing vehicle. When a trailer vehicle is connected to the towing vehicle for a relatively long period, the tire sensor modules of this trailer vehicle can likewise be stored in the control unit and uniquely associated with the individual tires. However, when the trailer vehicle is frequently changed, the tire sensor modules of the trailer vehicle are incorporated by the monitoring system by means of automatic trailer detection. As a result, in the event of the trailer vehicle being changed, there is no need for manual storage, but the respective tire sensor modules of the tires of the trailer vehicle cannot be associated with a particular tire on the basis of a fixed position.

For automatic trailer detection, the monitoring system in a moving commercial vehicle monitors a monitoring region for data messages from arbitrary tire sensor modules that are not yet known to the control unit. If a new or unknown tire sensor module is detected, it is established, and the plausibility thereof is checked, over a relatively long period of up to 30 minutes for example, whether or not the unknown tire sensor module belongs to the driver's own trailer vehicle. This is carried out, for example, by checking whether or not the tire sensor module moves concomitantly with the towing vehicle over this period by monitoring whether a particular number of data messages are transmitted by this unknown tire sensor module over this period. Once the trailer detection has concluded, i.e. affiliation of the tire sensor module or else of multiple tire sensor modules to the driver's own trailer vehicle has been established, the monitoring system is ready to also process and evaluate the corresponding data messages of the tire sensor module and to output status signals, for example, on the basis of the captured tire states and/or tire sensor module states.

A disadvantage in this case is that the tire states and/or tire sensor module states cannot be output on the basis of a fixed position, since, after conclusion of the trailer detection, the control unit does not know at which tire the tire sensor modules are arranged. Since the number of wheels is also unknown, it is also not possible to establish whether data messages are also actually received from every tire of the vehicle or possibly one of the tire sensor modules is faulty and no longer transmits data messages. In addition, the incorporation of all tire sensor modules detected in the monitoring region and associated with the driver's own trailer vehicle takes a very long time and, until the trailer identification is complete, the driver of the commercial vehicle is provided with no acknowledgement about the state of the tires of his trailer or about the state of the tire sensor module, for example in the event of a faulty sensor.

It is an object of the invention to specify a method for associating tire sensor modules with a trailer vehicle of a driver's own commercial-vehicle/trailer combination, as a result of which simple and reliable monitoring of tire states and/or tire sensor module states at all tires of the driver's own trailer vehicle is rendered possible.

This object is achieved by a method as claimed in claim 1. The subclaims specify preferred developments.

According to the invention, there is accordingly provision, during trailer detection, for tire sensor modules to be associated with a driver's own trailer vehicle of a driver's own commercial-vehicle/trailer combination by additionally taking into consideration a wheel position and a trailer axle configuration, which are stored on the tire sensor modules after the tires are fitted to the trailer vehicle, for example, and can be transmitted to a monitoring system on the driver's own vehicle/trailer combination using a data message. As a result, a position on the driver's own trailer vehicle can advantageously also be associated with the detected tire sensor modules, so that tire states and/or tire sensor module states can also be monitored and output on the basis of a fixed position.

For trailer detection, the data messages from all tire sensor modules in a monitoring region of a receiving module of the monitoring system are initially captured, the receiving module preferably being arranged on a towing vehicle of the commercial-vehicle/trailer combination. The captured data messages and the information transmitted thereby are used to perform a plausibility check or rating, which involves checking whether the tire sensor module is associated with the driver's own trailer vehicle or with an adjacent trailer vehicle. To achieve this, the captured data messages are initially associated with a tire sensor module merely using a sensor identification, and the number of captured data messages is incremented, for example by one, for each tire sensor module or for each sensor identification in each case. When a maximum counter is reached by a particular tire sensor module, the rating is started in order to establish whether the tire sensor modules detected up to then belong to the driver's own trailer vehicle or to an adjacent trailer vehicle. If, in the rating, it is established with a high level of certainty that a tire sensor module is arranged at a tire of the driver's own trailer vehicle, the respective tire sensor module is associated with the driver's own trailer vehicle.

According to one embodiment, which specifies simple trailer detection, the rating is carried out merely while travelling and the maximum counter is set to 30, for example. If this number of data messages is received for one particular tire sensor module, or if the maximum counter is reached, this tire sensor module is initially accepted and, for all further tire sensor modules in the monitoring region that are likewise moving, it is subsequently rated whether sufficient data messages have been received up to this time, so that an association with the driver's own trailer vehicle is very likely. If this is the case, these further tire sensor modules are also accepted.

To ensure that, during or after the conclusion of simple trailer detection, monitoring can also actually take place at all tires of the driver's own trailer vehicle, or tire sensor modules at all tires of the driver's own trailer vehicle have also actually been detected, the likewise transmitted wheel position is additionally taken into consideration, after individual tire sensor modules have been accepted, on the basis of the trailer axle configuration, these being buffer-stored on the control unit and in association with the applicable sensor identification after a tire sensor module is accepted. The trailer axle configuration can then advantageously be used to check how many axles and accordingly how many tires the trailer vehicle has and whether data messages from all of these tire sensor modules that are to be expected have been captured. Only then is the simple trailer detection concluded completely, and tire states and/or tire sensor module states for all those wheels of the trailer vehicle for which a unique association was able to be established in the check from the wheel position and the trailer axle configuration can be displayed to the driver on the basis of a fixed position.

The trailer axle configuration and the wheel position can, to this end, advantageously be transmitted in coded fashion using the data message. That is to say that every possible trailer axle configuration is assigned a respective value and every possible wheel position within the applicable trailer axle configuration is likewise allocated a respective value. This assignment is accordingly stored on a control unit of the monitoring system. If the value stored on the tire sensor module for the trailer axle configuration and the value for the wheel position of the tire sensor module within this trailer axle configuration are then transmitted to the monitoring system using the data message, the assignment stored on the control unit can be used to uniquely associate the position of the tire sensor module.

It is therefore advantageously possible to detect whether all the affiliated tire sensor modules have also been captured in the simple trailer detection and also the volume of the transmitted data is minimized, since the coding means that fewer data for the tire position need to be transmitted using the data message.

As a wheel position, it is advantageously also possible to resort to a coordinate representation in a previously stipulated coordinate system, in which case the wheel positions transmitted are the coordinate pair of the respective tire and additionally the trailer axle configuration.

To optimize the data transmission further, there is advantageously provision to split the content to be transmitted using the data message, i.e. the wheel position and the trailer axle configuration, over multiple data messages depending on the volume of data, the same respective section being used for the different content within a data message. Accordingly, for example a data message is used to transmit the trailer axle configuration and a further, preferably subsequent, data message is used to transmit the wheel position in the same section of the data message. In order to avoid misinterpretations of the data messages received from the control unit of the monitoring system, for example an identification bit is used to indicate what content is being transmitted, e.g. "0" for the trailer axle configuration and "1" for the wheel position. The control unit can then detect from the identification bit what information is being transmitted.

This approach is advantageous if the section provided for in a data message is not sufficient to transmit all the necessary information in just one data message.

According to an advantageous development, there is provision for the tire sensor modules associated with the driver's own trailer vehicle during the simple trailer detection to be checked for plausibility on the basis of the transmitted trailer axle configuration and the wheel position, in order to conclude the simple trailer detection completely.

To this end, it is possible to check, for example, whether each tire sensor module associated with the driver's own trailer vehicle on the basis of the sensor identification during the simple trailer detection uses the data message to also actually transmit a trailer axle configuration. This allows reliability to be increased, since, later, a display on the basis of a fixed position is effected only for those tire sensor modules that also support such a display by virtue of the information stored on them. Furthermore, it is possible to check whether each tire sensor module associated with the driver's own trailer vehicle on the basis of the sensor identification during the simple trailer detection transmits the same trailer axle configuration, in order to ensure that no incorrect information has been stored on the tire sensor modules. Furthermore, it is possible to check whether the number of tire sensor modules, subsequently called number of modules, associated with the driver's own trailer vehicle on the basis of the sensor identification during the simple trailer detection is less than or equal to the number of tire sensor modules on the driver's own trailer vehicle that is to be expected on the basis of the trailer axle configuration. Therefore, it is possible to establish to what extent a tire sensor module has also been detected for all tires of the driver's own trailer vehicle or whether too many or too few tire sensor modules have been detected.

In respect of the tire positions, it is possible to check whether each tire sensor module associated with the driver's own trailer vehicle on the basis of the sensor identification during the simple trailer detection uses the data message to also actually transmit a wheel position, for example in order to detect incomplete storage of the tire position on the individual tire sensor modules. Furthermore, it is checked whether each tire sensor module associated with the driver's own trailer vehicle on the basis of the sensor identification during the simple trailer detection transmits a different wheel position, for example in order to detect erroneous storage of the tire position on the tire sensor modules.

Finally, it is possible to check whether all wheel positions that are to be expected according to the trailer axle configuration are transmitted by the tire sensor modules, i.e. all tire positions are also actually in use, in order to detect missing tire sensor modules. If tire sensor modules have been detected for all tires, the simple trailer detection is complete, and tire states or tire sensor states can the displayed on the basis of a fixed position for each tire. If this is not the case, there are several options for nevertheless concluding the simple trailer detection:

If it has been detected that the number of modules is greater than the number of tire sensor modules that is to be expected according to the trailer axle configuration, the positional association of the tire sensor modules can advantageously be completely erased from the buffer store of the control unit, since display of tire states and/or sensor module states on the basis of a fixed position for all tire sensor modules is too unsafe, since it is unclear which tire sensor module(s) transmit(s) the applicable tire state and/or sensor module state. Furthermore, an error message can additionally be output. The simple trailer detection has then concluded, with display of tire states and/or tire sensor module states in this case, besides output of the message, being able to be effected selectively, for example not on the basis of a fixed position, so that it is at any rate possible to display to the driver that there is an error.

If it has been detected that individual tire sensor modules associated with the driver's own trailer vehicle on the basis of the sensor identification during the simple trailer detection transmit no trailer axle configuration and/or different trailer axle configurations using the data message, a trailer axle configuration can advantageously be assumed to be reliable and can be adopted for the driver's own trailer vehicle within the scope of the simple trailer detection if at least a, previously stipulated, maximum number of modules for tire sensor modules associated with the driver's own trailer vehicle transmit the same trailer axle configuration. The previously stipulated, maximum number of modules can correspond for example to half the number of modules for detected tire sensor modules for the driver's own trailer vehicle.

For those tire sensor modules for which no trailer axle configuration, or for which a different trailer axle configuration than the one assumed to be reliable, has been transmitted, the positional association of these tire sensor modules can be erased from the buffer store of the control unit, since display of tire states and/or sensor module states on the basis of a fixed position for these tire sensor modules is too unsafe, since it is unclear which tire sensor module(s) transmit(s) the applicable tire state and/or sensor module state. Furthermore, an error message can additionally be output. The simple trailer detection has then concluded, with display of tire states and/or tire sensor module states for these tire sensor modules in this case, besides output of the error message, being able to be effected selectively, for example not on the basis of a fixed position, so that it is at any rate possible to display to the driver that there is an error.

Alternatively, instead of the assumption of a reliable trailer axle configuration, the positional association of the tire sensor modules can be completely erased from the buffer store of the control unit if, for example, an assessment establishes that such an assumption is too unsafe. The reason is that display of tire states and/or sensor module states for these tire sensor modules on the basis of a fixed position is too unsafe in that case too, since it is unclear which tire sensor module(s) transmit(s) the applicable tire state and/or sensor module state. Furthermore, an error message can additionally be output. The simple trailer detection has then concluded, with display of tire states and/or tire sensor module states in this case, besides output of the error message, being able to be effected selectively, for example not on the basis of a fixed position, so that it is at any rate possible to display to the driver that there is an error.

If it has been detected that individual tire sensor modules associated with the driver's own trailer vehicle transmit no wheel position using the data message and/or tire sensor modules associated with the driver's own trailer vehicle do not transmit all wheel positions that are to be expected according to the trailer axle configuration and/or some tire sensor modules associated with the driver's own trailer vehicle have the same wheel position stored for them, i.e. a wheel position is occupied repeatedly by multiple tire sensor modules, then just the tire sensor modules that transmit a wheel position and whose wheel position is not occupied repeatedly have a position associated with them. An error message can be output for all other tire sensor modules. The simple trailer detection has then concluded, with display of tire states and/or tire sensor module states for these tire sensor modules in this case, besides output of the error message, being able to be effected selectively, for example not on the basis of a fixed position, so that it is at any rate possible to display to the driver that there is an error.

Alternatively, depending on assessment, the positional association of all tire sensor modules is completely erased from the buffer store of the control unit and if need be an error message is output. A display not on the basis of a fixed position is then effected for all tire sensor modules.

After the conclusion of simple trailer detection in which the position on the driver's own trailer vehicle has been associated with the tire sensor modules using the tire position and the trailer axle configuration according to the above criteria, it is advantageously possible to use the tire sensor modules to monitor tire states and/or tire sensor module states, to that end the data messages from the tire sensor modules associated with the driver's own trailer vehicle are evaluated and the respective tire states and/or the tire sensor module states are output using a status signal, in order to display the tire states and/or the tire sensor module states to the driver. In this case, output and display on the basis of a fixed position can be effected for the tire sensor modules with which a position has been associated, and output and display not on the basis of a fixed position can be effected for all other tire sensor modules, for example if the aforementioned plausibility check has resulted in a discrepancy being established, but the driver nevertheless needs to be warned.

According to a further embodiment, which specifies an extended trailer detection, rating the data messages in order to establish whether the tire sensor module is associated with the driver's own trailer vehicle or with an adjacent trailer vehicle additionally involves a trailer designation transmitted using the data message being taken into consideration. To this end, not only the sensor identification but also the trailer axle configuration, the tire position and the trailer designation are associated with each tire sensor module during the incrementing of the number of captured data messages already, i.e. even before the rating is started when the maximum counter is reached. To that end, during the incrementing of the received data messages, the trailer axle configuration, the tire position and the trailer designation can be buffer-stored for the applicable sensor identification on a control device.

In contrast to the simple trailer detection, in the extended trailer detection, the trailer axle configuration and the tire position are not first taken into consideration after the extended trailer detection has concluded or after the tire sensor modules have been accepted for the subsequent plausibility check and for display on the basis of a fixed position, but rather right from the outset. Additionally, the trailer designation is associated with the sensor identification, in order to advantageously allow filtering of tire sensor modules on the basis of further information stored on the tire sensor module.

This allows the extended trailer detection to be advantageously speeded up:

The reason is that individual tire sensor modules can be excluded or associated with the individual trailer vehicle immediately when the maximum counter is reached, i.e. when the rating is started, by virtue of certain criteria being checked on the basis of the additional information.

Accordingly, according to an advantageous development, the respectively detected tire sensor modules can already be associated with the driver's own trailer vehicle, and the extended trailer detection can already be concluded, if, before the maximum counter is reached, only data messages from tire sensor modules that transmit the same trailer designation, the same trailer axle configuration and wheel positions matching the trailer axle configuration have been captured.

To this end, the maximum counter can advantageously be stipulated at between 2 and 50, in particular between 2 and 10, since if only data messages having just a trailer designation, a trailer axle configuration and all tire positions matching the latter are received, it can be expected that the extended trailer detection will not deliver a different result even after lengthy incrementing. Therefore, the extended trailer detection can be terminated more quickly and tire states and tire sensor module states can be displayed.

According to an advantageous development, the respectively detected tire sensor modules can already be associated with the driver's own trailer vehicle, and the extended trailer detection can already be concluded, if, when the maximum counter is reached, it is established from the sensor identification, the trailer designation, the trailer axle configuration and the matching tire positions that only data messages from tire sensor modules that have already previously been detected as affiliated to the driver's own trailer vehicle have been captured. As a result, a known, already taught trailer whose data are still stored in the control unit can advantageously be recognized more quickly and the extended trailer detection can be terminated early. Therefore, additional information, namely the stored data pertaining to the most recently taught trailer vehicle, is used to increase reliability for the extended trailer detection.

According to an advantageous form, the respective tire sensor modules can already be associated with the driver's own trailer vehicle, and the extended trailer detection can already be concluded, if, when the maximum counter is reached, it is established that the data messages are used to transmit only a single trailer designation and a single trailer axle configuration, and data messages from at least a maximum number of modules for different tire sensor modules have been received. The maximum number of modules in this case can correspond to an arbitrary value between zero and the number of tire sensor modules that is to be expected on the basis of the trailer axle configuration, for example to a factor between 0.05 and 0.99, in particular 0.5, multiplied by the number of tire sensor modules that is to be expected on the basis of the trailer axle configuration. This also allows the time for the trailer detection to be minimized and at the same time reliable trailer detection to be effected, since it can be expected that lengthy incrementing does not deliver a different result.

Display of tire states and tire sensor module states is then initially effected merely on the basis of the detected tire sensor modules. In the background, tire sensor modules are furthermore detected and, if they match the driver's own trailer vehicle, i.e. the trailer designation, the trailer axle configuration and the tire positions are consistent, and no other inconsistencies arise, display of tire states and tire sensor module states is also effected for these tire sensor modules.

According to an advantageous development, the respective tire sensor modules can already be associated with the driver's own trailer vehicle, and the extended trailer detection can already be concluded, if, when the maximum counter is reached, it is established that the data messages are used to transmit no more than two trailer designations, wherein, for one trailer designation, data messages from all the number of tire sensor modules that is to be expected on the basis of the trailer axle configuration are captured and, for the other trailer designation, less than a limit percentage, for example 30% or 40%, of the number of tire sensor modules that is to be expected on the basis of the trailer axle configuration for this trailer designation is detected.

In that case, those tire sensor modules having the associated one trailer designation for which tire sensor modules have been received for all wheel positions are associated with the driver's own trailer vehicle, and the tire sensor modules having the other trailer designation are erased from the buffer store of the control unit. Therefore, display of all tire sensor modules of the driver's own trailer vehicle can take place.

Therefore, when the cited criteria are satisfied, the extended trailer detection can be concluded early in a few exceptional cases, and display of the appropriate information to the driver can be effected earlier.

The extended trailer detection can also be terminated early under certain conditions, however, for example if it is established that it does not lead to a fast and reliable result:

If it is accordingly established, according to an advantageous development, that, when the maximum counter is reached, data messages having three or more different trailer designations have been received, the extended trailer detection can be terminated, and the simple trailer detection described above is reverted to in order to allow reliable trailer detection. The same applies to the case in which the data messages are used to transmit precisely two trailer designations, wherein, for one trailer designation, data messages from all the number of tire sensor modules that is to be expected on the basis of the trailer axle configuration have been captured and, for the second trailer designation, a number of tire sensor modules that is greater than or equal to a limit percentage, for example 30% or 40%, obtained from the number to be expected on the basis of the trailer axle configuration for the second trailer designation have been detected.

So as not to terminate the extended trailer detection unnecessarily in these cases, when the vehicle/trailer combination is still at a standstill, there is preferably provision for the reception of two or more different trailer designations to be supported by virtue of this result being subjected to a plausibility check after travel begins. That is to say that there is a wait until the vehicle/trailer combination has started moving, and the extended trailer detection is terminated only when another two or more different trailer designations are detected even then and the conditions described above are satisfied.

Only when inconsistencies are detected can the extended trailer detection also already be terminated at a standstill. According to an advantageous development, there is accordingly provision for the rating of the data messages on the basis of the trailer designation, the wheel position and the trailer axle configuration to be terminated if at least two different tire sensor modules transmit the same tire position and the same trailer axle configuration and the same trailer designation or there are different trailer axle configurations for the same trailer designation. In that case, fast termination of the extended trailer detection will not lead to a reliable result, which means that there is instead a switch to the simple trailer detection without taking into consideration the trailer designation, or possibly the tire states and/or tire sensor module states are displayed not on the basis of a fixed position, this being rated in the plausibility check described above.

According to an advantageous development, the rating of the data messages after the maximum counter is reached within the context of this extended trailer detection on the basis of the trailer designation, the wheel position and the trailer axle configuration can take place at a standstill and/or while travelling, wherein, at a standstill, only data messages from tire sensor modules that are also at a standstill are taken into consideration, and, while travelling, only data messages from tire sensor modules that are moving are taken into consideration.

According to an advantageous embodiment, the incrementing of the number of captured data messages after travel begins can result in all those data messages from tire sensor modules that have a trailer designation that is no longer recognized after travel begins being ignored. This can save time and computing effort, since the monitoring of a large number of irrelevant tire sensor modules can be stopped and these thus no longer need to be taken into consideration for the rating. In particular, it allows tire sensor modules that—after the driver's own vehicle/trailer combination has changed its state of motion—have not changed their state of motion to be ignored.

This allows the number of detected tire sensor modules to be reduced, for example if the driver's own vehicle/trailer combination is in a car park.

To that end, the number of captured data messages for each tire sensor module is incremented in a standstill counter at a standstill and in a travel counter after travel begins, wherein the travel counter adopts the standstill counter for all those tire sensor modules from which data messages have already been captured at a standstill and that have likewise begun travelling. To that end, the standstill counter can be added to the travel counter, for example, which can also be zero if data messages have not yet been captured while travelling. This can advantageously save time, since, for already detected tire sensor modules, it is not necessary to start counting from zero as soon as the driver's own vehicle/trailer combination starts moving.

Furthermore, there can be provision for the rating to begin only when the vehicle/trailer combination is also moving. That is to say that if the maximum counter is already reached while at a standstill, there is nevertheless a wait until the vehicle begins to move.

This can advantageously ensure that a state for the tire sensor modules that is valid while at a standstill and that would lead to conclusion or termination of the extended trailer detection is also still observed while travelling. The extended trailer detection therefore becomes more reliable.

According to an advantageous form, to this end, the rating is started, and the standstill counter is added to the travel counter, only when, while travelling, at least a minimum number of data messages from a tire sensor module has been received, wherein the minimum number is between 1 and 30, in particular between 2 and 10. That is to say that there is a wait until a certain number of data messages has also been received while travelling, and only then is the rating started and the travel counter added to the standstill counter.

The waiting for the minimum number allows the extended trailer detection to be made more reliable, since for example trailer vehicles that are likewise starting to move are no longer in the monitoring region after a certain time, i.e. after the minimum number is reached.

According to a preferred form, there can be provision for different maximum counters and/or minimum counters to be chosen for the individual ratings within the context of the extended trailer detection. As such, each check can be provided with sufficient time to deliver a safe result for a fast trailer detection.

According to an advantageous form of the extended trailer detection, the respective tire sensor modules can already be associated with the driver's own trailer vehicle, and the extended trailer detection can already be concluded, if, when the maximum counter is reached, of between 2 and 50, in particular between 10 and 50, for a tire sensor module having a particular trailer designation, it is established that the number of tire sensor modules detected in total up to then having the same trailer designation as for this one tire sensor module is concordant with the number of number of tires that is to be expected on the basis of the trailer axle configuration for this one tire sensor module. In that case, only the tire sensor modules having this trailer designation are presented to the driver on the basis of the trailer axle configuration.

As a result, the extended trailer detection can advantageously be speeded up, because, on the basis of the trailer designations, plausible filtering takes place in which there is a high probability of tire sensor modules with a nonmatching trailer designation being ignored. In this case, it is assumed that the first tire sensor module that reaches the maximum counter belongs to the driver's own trailer vehicle. Matching tire sensor modules, i.e. having the same trailer designation, are then likewise accepted, even if their count is possibly distinctly below the maximum counter value.

According to an advantageous development, for the further tire sensor modules that have the same trailer designation, it can be an additional requirement for sufficient data messages to need to be received for these tire sensor modules too before they are also actually accepted.

According to an advantageous embodiment, there can be provision for, if the number of tire sensor modules having the same trailer designation that are detected in total up to then is not yet concordant with the number of number of tires that is to be expected on the basis of the trailer axle configuration for this tire sensor module, the extended trailer detection nevertheless to be concluded and the tire sensor modules that are still missing to be accepted only when data messages from these tire sensor modules have been received. Up to then, the whole trailer vehicle with its trailer axle configuration can be presented already and the data of the missing tire sensor modules are not presented until they are received.

This can advantageously achieve the effect that, in the case of trailer vehicles having a lift axle, the tire sensor modules of which, although received while travelling, are ignored for the extended trailer detection on account of the differing state of motion, conclusion of the extended trailer detection is not unnecessarily delayed because the full number of tire sensor modules that are to be expected has actually not yet been able to be detected. Furthermore, it may be the case that individual tire sensor modules can be received very poorly. In order to allow information on the tire states and/or tire sensor states from the already received tire sensor modules in advance in these two cases in particular, early termination is advantageous.

In the case of extended trailer detection—as in the case of simple trailer detection—the conclusion of the extended trailer detection can additionally also be preceded by the plausibility check described above checking inconsistencies, e.g. whether two tire sensor modules transmit the same tire position, etc. Only when no inconsistencies have been found is the extended trailer detection concluded, and display of tire states and/or tire sensor module states on the basis of a fixed position can take place.

If inconsistencies arise, an error message can be output for the applicable tire sensor modules. The extended trailer detection is then terminated and the simple trailer detection is continued, so that display of tire states and/or tire sensor module states for these tire sensor modules in this case can be effected selectively, for example not on the basis of a fixed position, so that it is at any rate possible to display to the driver that there is an error.

BRIEF DESCRIPTION OF THE SEVERAL VIEWS OF THE DRAWING(S)

The invention will be explained in greater detail below on the basis of exemplary embodiments. In the drawing:

FIG. 1 shows multiple adjacent commercial-vehicle/trailer combinations;

FIG. 2a, b, c show exemplary depictions of trailer axle configurations;

DETAILED DESCRIPTION OF THE INVENTION

Figure 2A:
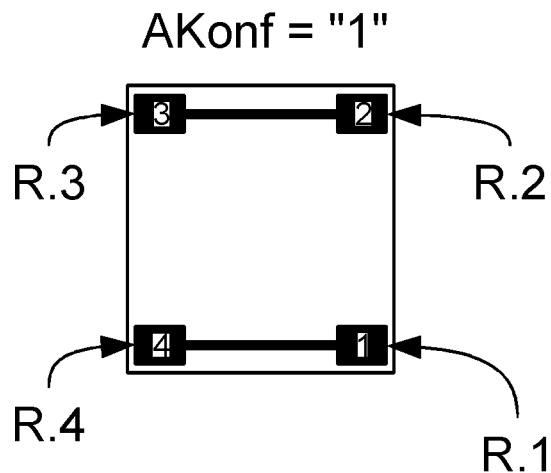
FIG. 2d shows a coordinate system for wheel positions.

FIG. 1 shows a commercial-vehicle/trailer combination 1 having a towing vehicle 2 and a trailer vehicle 3. The towing vehicle 2, or the tractor, can be e.g. a semitrailer tractor, a normal truck (panel truck), a bus, a forklift truck, etc. The trailer vehicle 3 is, according to this embodiment, embodied as a two-axle trailer connected to the towing vehicle 2 via a drawbar. There can alternatively be provision for other embodiments of the commercial-vehicle/trailer combination 1, for example a semitrailer tractor as the towing vehicle 2 with a single- or multi-axle semitrailer 2 as the trailer vehicle 3 or a four-axle drawbar trailer as the trailer vehicle 3. Therefore, different trailer axle configurations AKonf are possible for the trailer vehicle 3.

A control unit 4 (ECU) connected to a or multiple receiving module(s) 5 is provided on the towing vehicle 2. A receiving module, which is not depicted, may likewise be included in the control unit 4. In this case, the receiving module 5 is preferably arranged at a rear end of the towing vehicle 2. The receiving module 5 is designed to receive a data message S1 from tire sensor modules 6.$i$, where $i=1$ to 4, at tires on the driver's own trailer vehicle 3 or from surrounding tire sensor modules 106.$i$, 206.$i$ at tires on adjacent trailer vehicles 103, 203 and to forward them to the control unit 4, the index "i" being associated with a tire on the respective trailer vehicle 3, 103, 203 that also has a tire sensor module 6.$i$, 106.$i$, 206.$i$.

FIG. 1 shows the tire sensor modules 6.$i$, 106.$i$, 206.$i$, in exemplary fashion, only on the tires of the trailer vehicles 3, 103, 203. In principle, tire sensor modules may also be arranged on the respective towing vehicles 2, 102, 202. These are not relevant to the subject matter according to the invention, however. Within the context of the invention, it is assumed that the control unit 4 can filter out the data messages S1 coming from a tire sensor module on the towing vehicle 2, 102, 202 by checking whether a received data message S1 is used to transmit a towing vehicle affiliation. If this is the case, then this data message S1 can be ignored for certain functions on the control unit 4, for example for a trailer detection. On the basis of that, depiction of the tire sensor modules on the towing vehicle 2, 102, 202 is dispensed with.

The tire sensor modules 6.$i$, 106.$i$, 206.$i$ can capture tire states, such as for example a tire pressure p, a tire temperature T and mechanical stresses s in the tires on which they are arranged, can process the captured tire states p, T, s and can output them wirelessly, for example by means of a radio-frequency radio signal, using the data message S1. Furthermore, the data message S1 can be used to output a sensor identification ID.$i$ or a sensor identifier, a critical tire sensor module state, for example a sensor fault, or a loose tire sensor module 6.$i$, 106.$i$, 206.$i$ but also a state of motion of the respective tire.

Additionally, there is provision for fitting of the tires to the respective trailer vehicle 3, 103, 203 to be followed by a wheel position R.$i$, the trailer axle configuration AKonf and a trailer designation B being stored on the applicable tire sensor module 6.$i$, 106.$i$, 206.$i$. The index "i" in the sensor identification ID.$i$ and the wheel position R.$i$ in this case indicates the association with a particular tire of the respective trailer vehicle 3, 103, 203. It is likewise stored whether the tire sensor module 6.$i$, 106.$i$, 206.$i$ is arranged on a tire of the trailer vehicle 3, 103, 203 or of the towing vehicle 2, 102, 202 in order to be able to ascertain the aforementioned towing vehicle affiliation.

Therefore, according to this system in the exemplary embodiment shown in FIG. 1, the first tire sensor module 6.1 of the driver's own trailer vehicle 3 stores for example "rear right" as the wheel position R.1, "two-axle, each individually tired, drawbar" as the axle configuration AKonf and "A1" as the trailer designation B, the trailer designation B being chosen merely in exemplary fashion. For the third tire sensor module 6.3, accordingly R.3="front left", AKonf="two-axle, each individually tired, drawbar" and B="A1". For the adjacent left-hand trailer vehicle 103 in FIG. 1, each tire sensor module 106.$i$ stores the axle configuration AKonf="three-axle, each individually tired, semitrailer" and the trailer designation B="A2". The wheel positions R.$i$ are stored in a suitable manner in relation to the index i according to the positions on the axles. For the adjacent right-hand trailer vehicle 203, each tire sensor module 206.$i$ stores the axle configuration AKonf="two-axle, each individually tired, semitrailer" and the trailer designation B="A3". The wheel positions R.$i$ are stored in a suitable manner in relation to the index i according to the positions on the axles.

In order to optimize transmission of the aforementioned information using the data message S1, i.e. to minimize the volume of data, the data transmission can be effected in coded fashion. FIG. 2a, b, c depict exemplary trailer axle configurations AKonf for the trailer vehicles 3, 103, 203 depicted in FIG. 1, with assigned wheel positions R.$i$ stored on the control unit 4. The depicted trailer axle configurations AKonf are merely exemplary and, depending on the number of axles and the axle position and also the tires provided, i.e. single tires or double tires, can be extended arbitrarily.

For the driver's own trailer vehicle 3 in FIG. 1, the trailer axle configuration AKonf, to which the trailer axle configuration AKonf with the value "1" is assigned in the control unit 4, is relevant according to FIG. 2a. This trailer axle configuration AKonf="1" has four uniquely associated wheel positions R.$i$="1", "2", "3", "4". On the first tire sensor module 6.1 of the driver's own trailer vehicle 3, is now sufficient to store the value "1" for the trailer axle configuration AKonf, the value "1" (corresponds to the index i) for the wheel position R.1 and the value "A1" for the designation B. These can then be transmitted to the monitoring system 100 using the data message S1 in an appropriate manner. As soon as the control unit 4 reads the trailer axle configuration AKonf="1", it changes to the depiction shown in FIG. 2a and the value "1" for the wheel position R.1 is used to detect that this is the rear right tire. Therefore, just a little transmitted information allows a unique positional association of the first tire sensor module 6.1 on the basis of the stored depiction shown in FIG. 2a.

Figure 2B:
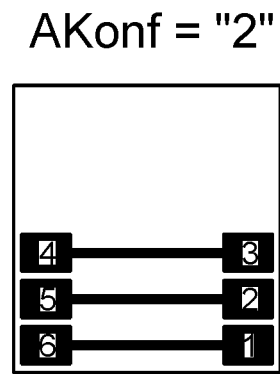
Figure 2C:
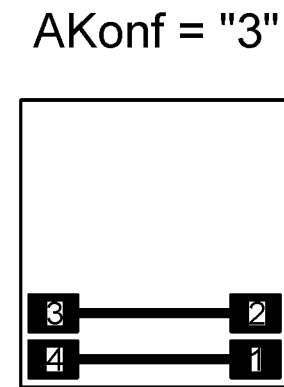

Accordingly, FIG. 2b, i.e. AKonf="2", is relevant for the left-hand trailer vehicle 103 and FIG. 2c, i.e. AKonf="3", is relevant for the right-hand trailer vehicle 203, the systems of which are used to store the applicable values for the trailer axle configuration AKonf and the wheel position R.i on the tire sensor modules 106.i, 206.i of the adjacent trailer vehicles 103, 203, the index "i" in this case also again indicating the tire on the applicable trailer vehicle 1.

Therefore, the volume of data in the transmitted data and also in the stored data can be minimized, facilitating communication between the control unit 4 and the tire sensor modules 6.i, 106.i, 206.i and allowing faster data transmission.

Figure 2D:
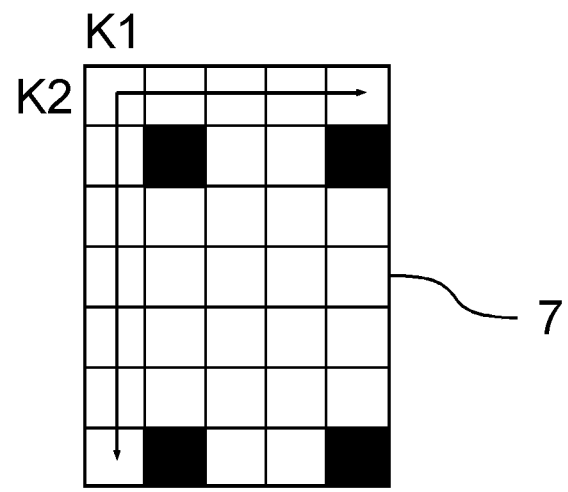

Alternatively, an arbitrary other coordinate description can be used for the wheel positions R.i. In this regard, FIG. 2d shows a coordinate system 7 usable for wheel positions R.i in exemplary fashion for the trailer axle configuration AKonf="1". Said coordinate system can be used to associate unique positions having two coordinates K1, K2, i.e. a coordinate pair, with the wheels. In this case, the trailer axle configuration AKonf is furthermore transmitted, besides the coordinates K1, K2, using the data message S1, in order to establish whether wheel positions R.i have been able to be received for all vehicle axles or individual tire sensor modules 6.i, 106.i, 206.i transmit no data.

If the number of values for the wheel positions R.i, the trailer axle configuration AKonf and in particular the trailer designation B means that a section available for this information in the data message S1, for example of 8 bits, is exceeded, then this information R.i. AKonf, B can also be split over multiple data messages S1, the same respective section being used for the different content within a data message. Accordingly, for example a data message S1 is used to transmit the trailer axle configuration AKonf and a further, preferably subsequent, data message S1 is used to transmit the wheel position R.i in the same section of the data message S1.

In order to avoid misinterpretations of the data messages S1 received from the control unit 4 of the monitoring system 100, for example an identification bit is used to indicate what content is being transmitted, e.g. "0" for the trailer axle configuration AKonf and "1" for the wheel position R.i. The control unit 4 can then detect from the identification bit what information R.i and AKonf is being transmitted. If the trailer designation B is to be transmitted in a third data message S1, the identification requires two bits, in order to be able to distinguish between R.i, AKonf and B.

If the transmission of the trailer designation B requires significantly more than the aforementioned 8 bits, a larger section within the data message S1 can also be made available for transmitting the trailer designation B or a longer data message S1 than usual can be generated.

The control unit 4 processes the data transmitted in the data message S1 and picked up by the receiving module 5 further. The control unit 4 and the receiving module 5 and also possibly the further receiving module in the control unit 4 form a monitoring system 100 in this case for monitoring tire states p, T, s and critical tire sensor module states using the tire sensor modules 6.i, 106.i, 206.i, wherein the tire sensor modules 6.i on the driver's own trailer vehicle 3 preferably need to be evaluated in order to allow monitoring of the tire states p, T, s and of critical tire sensor module states on the driver's own trailer vehicle 3 and to limit the volume of data to be processed.

In order to teach a driver's own trailer vehicle 3 and, to this end, to uniquely detect tire sensor modules 6.i from the driver's own trailer vehicle 3, automatic trailer detection (ATL—automatic trailer learning) is performed that, according to a simple variant embodiment, is performed only when the commercial-vehicle/trailer combination 1 moves, i.e. for example the ignition is operated and the tire sensor modules of the towing vehicle 2 report a movement.

Figure 3:
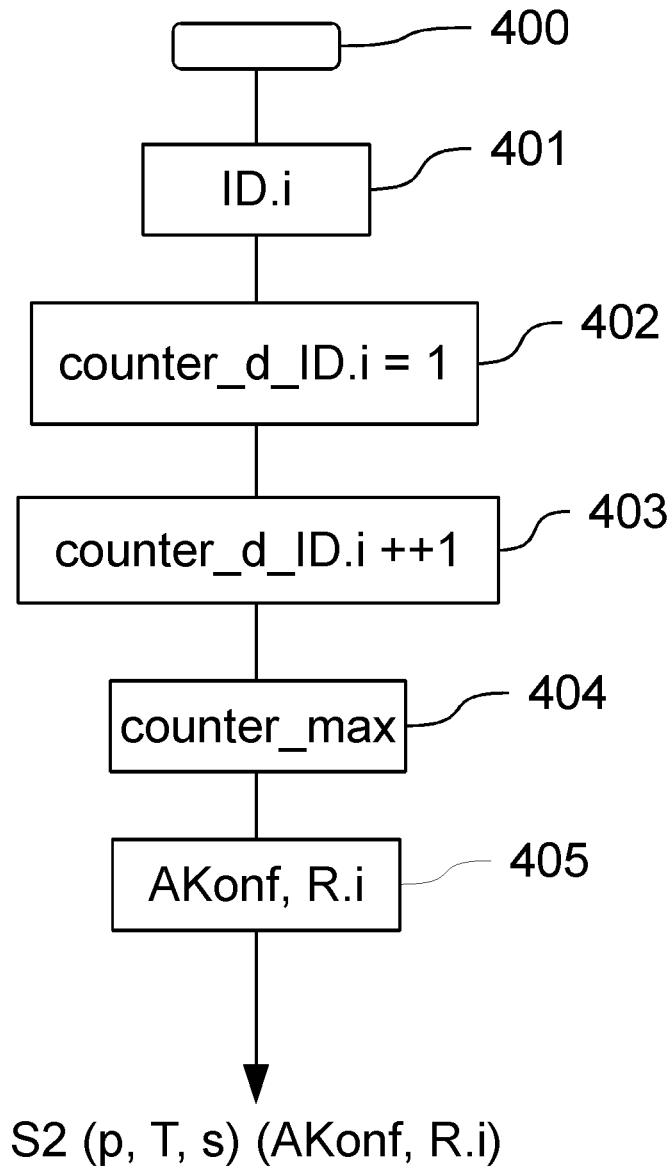
FIG. 3 shows a flowchart for a simple trailer detection.

To that end, according to the flowchart in FIG. 3—after a movement by the commercial-vehicle/trailer combination 1 has been detected in an initial step 400—a first step 401 involves each tire sensor module 6.i, 106.i, 206.i detected in a monitoring region 8 of the receiving module 5 ascertaining the sensor identification ID.i transmitted using the data message S1 and buffer-storing it on the control unit 4, only moving tire sensor modules 6.i, 106.i, 206.i being taken into consideration. A travel counter counter_d_ID.i is associated with each new sensor identification ID.i in a second step 402 and said travel counter is set to one. In a third step 403, for each received data message S1 having a particular sensor identification ID.i, the applicable travel counter counter_d_ID.i is increased. If one of the travel counters counter_d_ID.i for a particular tire sensor module 6.i, 106.i, 206.i has reached a previously stipulated maximum counter counter_max of for example 30 received data messages S1 having this sensor identification ID.i, a fourth step St404 involves this tire sensor module 6.i being accepted, and a rating takes place in which a check is performed for each further detected tire sensor module 6.i, 106.i, 206.i to ascertain whether it has a high probability of likewise belonging to the driver's own trailer vehicle 3. If this is the case, the applicable tire sensor modules 6.i are likewise accepted, accepting being intended to be understood to mean that they are associated with the driver's own trailer vehicle 3.

Since this simple trailer detection process is performed while travelling and lasts several minutes, it is assumed that a smaller number of data messages S1 is received—if any—from tire sensor modules 106.i, 206.i that do not belong to the driver's own trailer vehicle 3 than the stipulated maximum counter counter_max, which means that the accepted tire sensor modules 6.i have a high probability of being able to be classified as belonging to the driver's own trailer vehicle 3. It is thus assumed below that the accepted tire sensor modules 6.i are those on the driver's own trailer vehicle 3.

According to this embodiment of the simple trailer detection, the accepting of individual tires sensor modules 6.i is additionally followed, in a final fifth step 405, by the trailer axle configuration AKonf transmitted by the accepted tire sensor modules 6.i and the tire positions R.i being evaluated by the control unit 4 and buffer-stored thereon for a positional association. That is to say that after the tire sensor modules 6.i have been accepted, the wheel position R.i within the respective trailer axle configuration AKonf can also be associated with the respective sensor identification ID.i. If a critical tire state p, T, s or a critical tire sensor module state is thus detected on the basis of the data transmitted by the data messages S1, this can be output on the basis of a fixed position using a status signal S2 and communicated to the driver, for example on a display. Even without a critical tire state or tire sensor module state, however, the status signal S2 can be output in order to display the current tire pressure p and/or the current tire temperature T, for example, to the driver.

During or after the simple trailer detection described above, discrepancies can arise in the information received from the tire sensor modules 6.*i* associated with the driver's own trailer vehicle 3. By way of example, a wheel position R.i may not match the trailer axle configuration AKonf, a wheel position R.i may be occupied repeatedly, or accepted tire sensor modules 6.*i* may have different trailer axle configurations AKonf. This can arise, for example, when tires are replaced and, as a result, the replacer forgets to store the wheel positions R.i and/or the trailer axle configuration AKonf afresh on individual tires.

Figure 4:
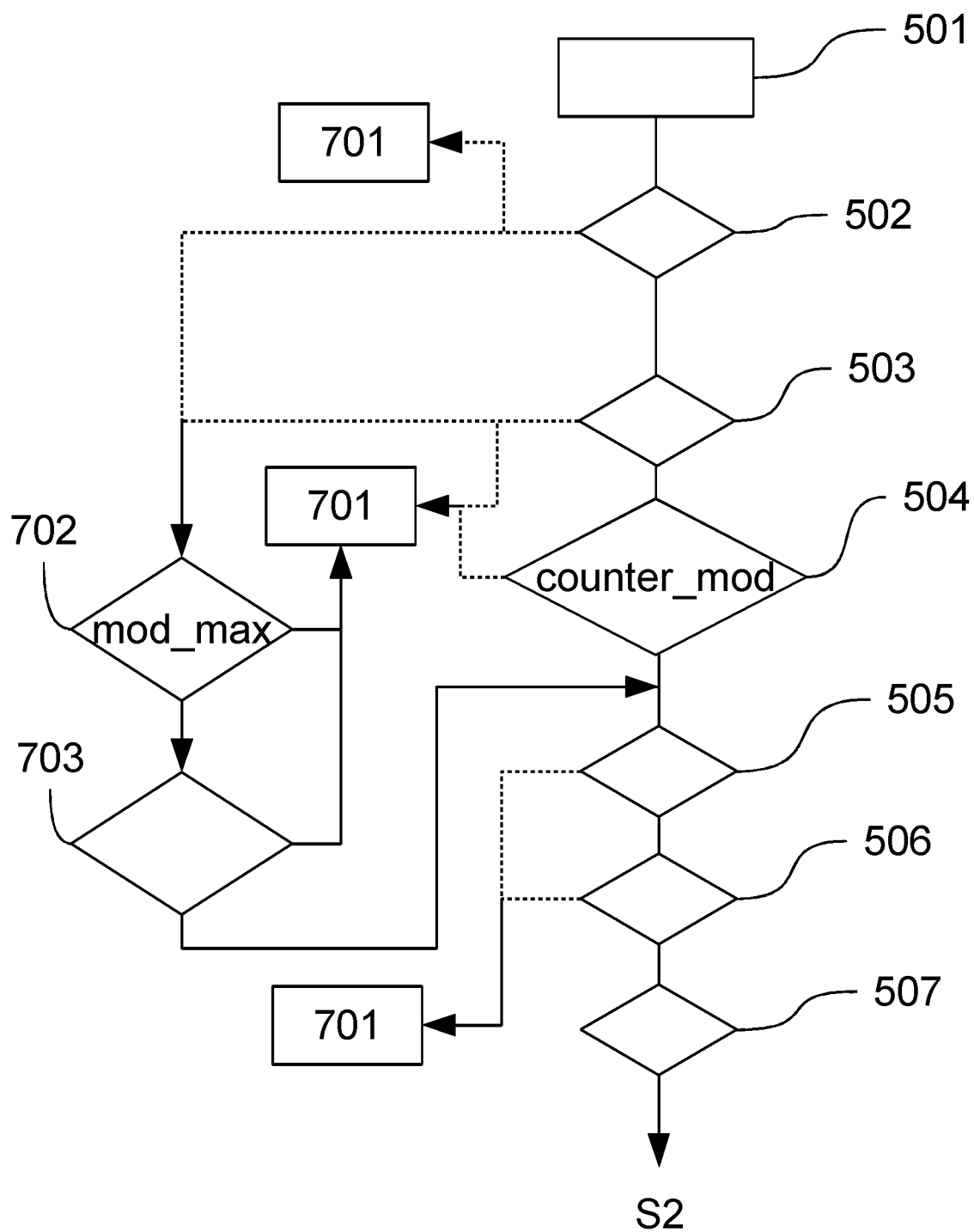
FIG. 4 shows a flowchart for a plausibility check.

To detect this and react thereto accordingly, FIG. 4 depicts a flowchart for a plausibility check on the detected and accepted tire sensor modules 6.*i* of the driver's own trailer vehicle 3, this being able to be performed in the background after the individual tire sensor modules 6.*i* are accepted and/or also after the simple trailer detection is concluded.

Accordingly, the method is started in a first step 501, for example after step 405 in FIG. 3, i.e. after the individual tire sensor modules 6.*i* have been accepted and the simple trailer detection can actually be concluded. A second step 502 involves checking whether each tire sensor module 6.*i* accepted on the basis of the sensor identification ID.i during the simple trailer detection uses the data message S1 to transmit a trailer axle configuration AKonf. If this is the case, a third step 503 involves checking whether the same trailer axle configuration AKonf exists for all tire sensor modules 6.*i* accepted on the basis of the sensor identification ID.i during the simple trailer detection. If this is the case, a fourth step 504 involves a number of modules counter_mod being ascertained, i.e. a number of tire sensor modules 6.*i* detected on the basis of the sensor identification ID.i during the simple trailer detection. If this number of modules counter_mod is less than or equal to the number of tire sensor modules 6.*i* on the driver's own trailer vehicle 3 that is to be expected according to the trailer axle configuration AKonf, a fifth step 505 involves an evaluation of the wheel positions R.i taking place. This involves initially checking whether each tire sensor module 6.*i* accepted on the basis of the sensor identification ID.i during the simple trailer detection has used the data message S1 to transmit a wheel position R.i. If this is the case, a sixth step 506 involves checking whether a wheel position R.i is allocated repeatedly. If this is not the case, a seventh step 507 involves checking whether all wheel positions R.i according to the transmitted trailer axle configuration AKonf are present, i.e. whether the number of modules counter_mod is concordant with the number of tire sensor modules 6.*i* on the driver's own trailer vehicle 3 that is to be expected according to the trailer axle configuration AKonf.

If this is the case, the simple trailer detection works as desired and can be concluded completely, and the status signal S2 can be used to output the tire state p, T, s or the tire sensor module state for all tires in order to display it on the basis of a fixed position on a display for the driver, so that a state can be displayed to him for all tires.

If there is inevitably a switch to a different path—than the one described above—in individual steps as shown in FIG. 4, there are several options for nevertheless concluding the simple trailer detection completely. If it is accordingly detected in step 502 that a trailer axle configuration AKonf is not transmitted by all accepted tire sensor modules 6.*i*, the positional association of the tire sensor modules 6.*i* is erased completely from the buffer store of the control unit 4 in a first switching step 701 and, if a critical tire state p, T, s or tire sensor module state is detected at the same time, an arbitrary already accepted tire sensor module 6.*i* uses the status signal S2 to output that there is a critical tire state p, T, s or a critical tire sensor module state at an arbitrary tire of the driver's own trailer vehicle 3. That is to say that, according to this variant, no position-related display can take place. The driver himself therefore needs to check which tire is involved. Additionally, an error message can be output indicating that a positional association is not possible on account of inconsistencies. The first switching step 701 is shown repeatedly in the flowchart in this case in order to preserve the clarity of the flowchart.

Alternatively, a second switching step 702 can involve checking whether more than a maximum number of modules mod_max, which indicates for example half the accepted tire sensor modules 6.1, i.e. counter_mod/2, transmit the same trailer axle configuration AKonf. If this is not the case, the first switching step 701 is revisited. If this is the case, the trailer axle configuration AKonf is assumed to be reliable and a third switching step 703 involves checking whether the number of modules counter_mod is less than or equal to the number of tire sensor modules 6.*i* on the driver's own trailer vehicle 3 that is to be expected according to the trailer axle configuration AKonf. If this is the case, the fifth step 505 in the flowchart is visited and the process continues from there.

For those tire sensor modules 6.*i* for which no trailer axle configuration AKonf, or for which a different trailer axle configuration AKonf than the one assumed to be reliable, has been transmitted, the positional association is then erased from the buffer store of the control unit 4, since display of tire states and/or sensor module states on the basis of a fixed position for these tire sensor modules 6.*i* is too unsafe, since it is unclear which tire sensor module(s) 6.*i* transmit(s) the applicable tire state and/or sensor module state. Furthermore, an error message can be output indicating that a positional association is not possible for these tire sensor modules 6.*i* on account of inconsistencies.

If the third switching step 703 is not performed, the first switching step 701 is revisited. Additionally, it can be indicated that too many tire sensor modules 6.*i* have been accepted.

If the second step 502 is performed and if it is established in the third step 503 that the trailer axle configuration AKonf is not identical for all accepted tire sensor modules 6.*i*, the first switching step 701 or the second switching step 702 is continued as stated above.

If the third step 503 is performed and the fourth step 504 is not, the first switching step 701 is visited. Additionally, it can be indicated that too many tire sensor modules 6.*i* have been accepted.

If it is established in the fifth step 505 that not all accepted tire sensor modules 6.*i* transmit a wheel position R.i, the first switching step 701 is visited or else, for the subsequent steps 506 and 507, only those accepted tire sensor modules 6.*i* that transmit a wheel position R.i are taken into consideration and displayed. All other accepted tire sensor modules 6.*i* are classified in the control unit 4 as "not associated" and the plausibility check in the sixth step 506 is continued only with the associated tire sensor modules 6.*i*.

If a wheel position R.i has been detected repeatedly in the sixth step 506, either the first switching step 701 is visited or the tire sensor modules 6.*i* associated with this wheel position R.i are not taken into consideration for a display on the basis of a fixed position and the positional association thereof is erased from the buffer store of the control unit 4. Furthermore, an applicable error message can be output for these tire sensor modules 6.*i*. Additionally, a display of a critical tire state p, T, s or of a critical tire sensor module state not on the basis of a fixed position can be output for these repeatedly detected wheel positions R.i. For all further tire sensor modules 6.i with a unique wheel position R.i, a display of the tire states and tire sensor module states on the basis of a fixed position then takes place.

If it has been established in the seventh step 507 that tire sensor modules 6.i according to the trailer axle configuration AKonf have not been received for all wheel positions R.i, then the tire states p, T, s or the tire sensor module states are displayed only for the tire sensor modules 6.i found within the scope of the simple trailer detection. For the missing wheel positions, either no content is displayed or an indication that no data messages S1 have been received for these wheel positions is given.

Therefore, multiple branches are possible in order to to react to a discrepancy or inconsistencies in the simple trailer detection. The manner of reaction can be decided by assessing the advantages and disadvantages of the applicable path for the vehicle/trailer combination 1 used.

Once the simple trailer detection shown in FIG. 3 and the plausibility check shown in FIG. 4 have concluded, the accepted tire sensor modules 6.i firmly store the sensor identifications ID.i and affiliated wheel positions R.i and the affiliated trailer axle configuration AKonf in the control unit 4, so that the data of the most recently detected trailer vehicle 3 are present in the control unit 4. If there were inconsistencies during the plausibility check, the wheel position R.i and/or trailer axle configuration AKonf are not or only partly stored, depending on the strategy.

According to a further embodiment, there is provision for an extended trailer detection to additionally involve the trailer designation B of the trailer vehicle 3, 103, 203 and also the trailer axle configuration AKonf and the wheel position R.i being buffer-stored on the control unit 4 if a new tire sensor module 6.i, 106.i, 206.i has been detected in the monitoring region 8. In contrast to the embodiment of the simple trailer detection that is described in FIG. 3, this buffer-storing can also already be effected at a standstill in this extended embodiment.

That is to say that the tire sensor module 6.i, 106.i, 206.i and the sensor identification ID.i additionally also have the trailer designation B of the trailer vehicle 3, 103, 203 affiliated to the applicable tire sensor module 6.i, 106.i, 206.i and also the trailer axle configuration AKonf and the wheel position R.i on the respective trailer vehicle 3, 103, 203 associated with them and buffer-stored on the control unit 4. Accordingly, not only the sensor identification ID.i but also the trailer axle configuration AKonf, the tire position R.i and the trailer designation B are associated with each newly detected tire sensor module 6.i, 106.i, 206.i during the incrementing of the number of captured data messages S1 already, i.e. even before the rating is started when the maximum counter counter_max is reached. As a result, the data picked up during the extended trailer detection can be bundled and filtering of unimportant data during the extended trailer detection can be carried out more efficiently, since after the maximum counter counter_max is reached, i.e. immediately when the rating starts, an association or non-association can already be made.

Figure 5:
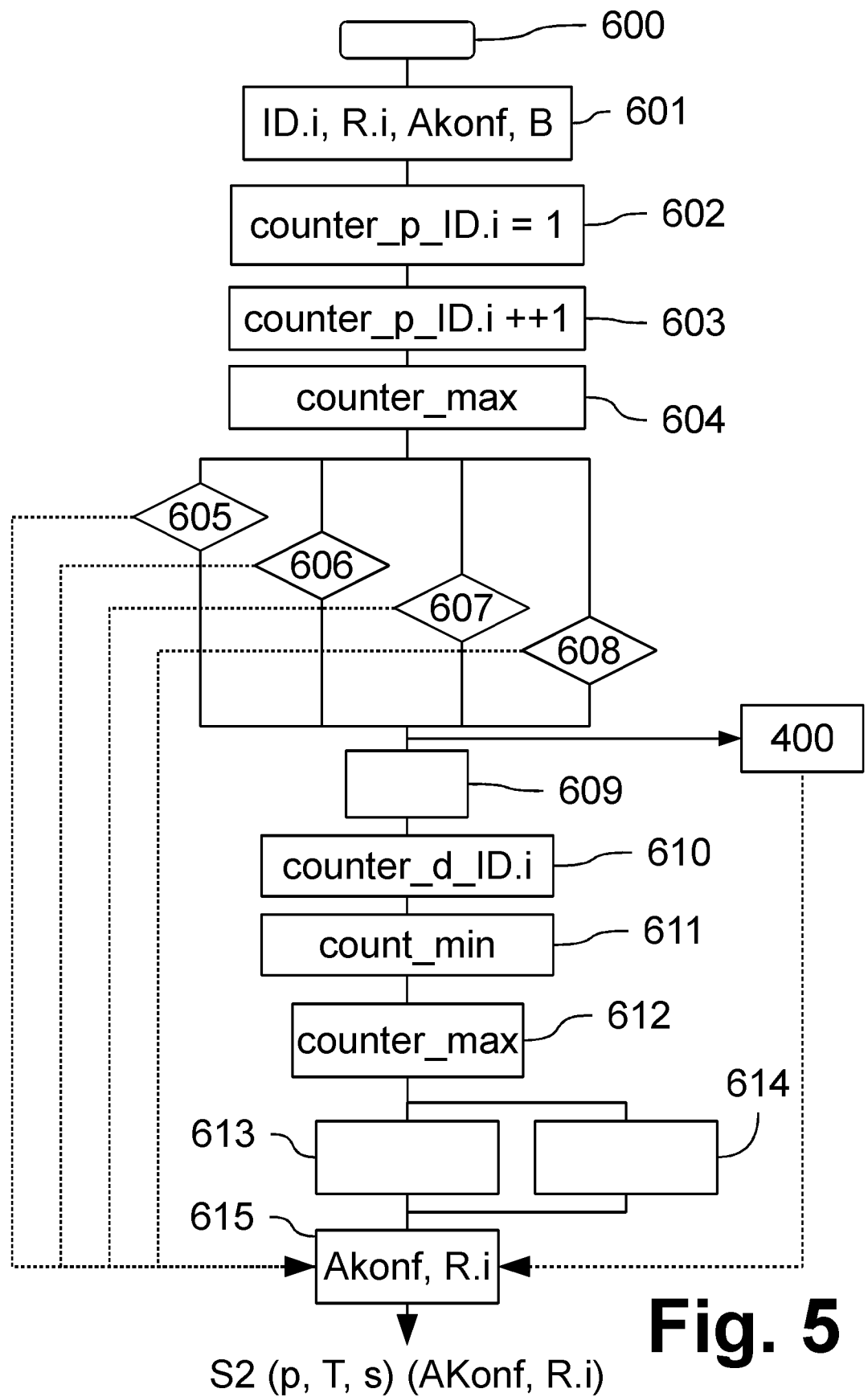
FIG. 5 shows a flowchart for an extended trailer detection.

Accordingly, as shown in FIG. 5, in an initial step 600, tire sensor modules 106.i, 206.i detected at the beginning of the extended trailer detection that transmit a state of motion indicating moving wheels can be ignored, since the detection starts at a standstill already.

For a freshly detected, non-moving tire sensor module 6.i, 106.i, 206.i having the sensor identification ID.i, the sensor identification ID.i and also the affiliated wheel positions R.i, trailer axle configurations AKonf and also the trailer designation B are buffer-stored on the control unit 4, according to their association, at a standstill in a first step 601. A second step 602 involves a standstill counter counter_p_ID.i for every freshly received ID.i of a nonmoving tire sensor module 6.i, 106.i, 206.i being set to one, and a third step 603 involves the standstill counter counter_p_ID.i for every data signal S1 received from this tire sensor module 6.i, 106.i, 206.i at a standstill being incremented for example by one.

If the maximum counter counter_max is reached for a tire sensor module 6.i in a fourth step 604, a rating of the previously detected tire sensor modules 6.i, 106.i, 206.i starts at a standstill already, as in FIG. 3 too. The time after which such a rating takes place is stipulated by means of the maximum counter counter_max. This maximum counter counter_max can be stipulated for the extended trailer detection, for example at between 2 and 10 received data messages S1 per sensor identification ID.i.

The maximum counter counter_max can be chosen to be lower, in principle, for the extended trailer detection, since the safety of the detection is achieved not only by means of the maximum counter counter_max but additionally by means of the trailer designation B and the associated rating. That is to say that even lengthy counting of data messages S1 per sensor identification ID.i has a high probability of not delivering a different result. This can save time.

If, after the maximum counter counter_max is reached, it has been established that two different sensor identifications ID.i have had the same trailer designation B, the same trailer axle configuration AKonf and also the same wheel position R.i associated with them, there is a reaction with an appropriate error message and the simple trailer detection, described above, shown in FIG. 3 without taking into consideration the trailer designation B is resorted to, this being carried out as soon as the vehicle/trailer combination 1 starts moving. Up until then, the detected tire sensor modules 6.i, 106.i, 206.i can alternatively be used to display the tire states or tire sensor states on the basis of a fixed position within the context of environment monitoring. The driver himself then needs to check which tire, possibly even on adjacent trailer vehicles 103, 203, is faulty.

The same can be performed if sensor identifications ID.i having the same trailer designation B but different trailer axle configurations AKonf have been associated. Overall, the flowcharts shown in FIG. 4 is applicable here as appropriate for inconsistencies.

The extended trailer detection can be terminated if three or more trailer designations B are captured during the rating after the maximum counter counter_max is reached at a standstill, since in this case it can be assumed that a fast trailer detection is very improbable. In this case, the simple trailer detection shown in FIG. 3 is resorted to. In order not to unnecessarily terminate the extended trailer detection after the maximum counter is reached at a standstill, however, for example because a multiplicity of different trailer designations B are to be expected at a standstill in a car park, the extended trailer detection in that case is preferably terminated only after an additional plausibility check after travel begins, and there is a switch to the simple trailer detection if three or more trailer designations B are still captured even then.

The same can be performed if only two different trailer designations B have been captured and at the same time the number of detected tire sensor modules 6.i for one trailer designation, e.g. B="A1", is the same as the tire sensor modules 6.i that can be expected on the basis of the trailer axle configuration AKonf, and, at the same time, for the second trailer designation, e.g. B="A3", the number of detected tire sensor modules $6.i$ is equal to or greater than a limit percentage per_th of for example 40% of the tire sensor modules $206.i$ to be expected on the basis of the trailer axle configuration AKonf.

For as fast a trailer detection as possible, the trailer designation B can be used to check multiple criteria in parallel or in succession in the following steps.

Accordingly, in a fifth step 605, already at a standstill and after the maximum counter counter_max of for example two is reached, it is possible to rate whether there is just one trailer designation B and the transmitted trailer axle configuration AKonf is identical for all tire sensor modules $6.i$ and the wheel position R.i also matches this trailer axle configuration AKonf.

The safety of the detection despite a low maximum counter counter_max is ensured in this case by virtue of just one trailer designation B and just one trailer axle configuration AKonf being present and the number of sensor identifications ID.i corresponding exactly to the number of wheels of the trailer axle configuration AKonf and each wheel position R.i being occupied only once. It is therefore unlikely that the choice of a higher maximum counter counter_max will deliver a different result.

In order to make certain that the only detected trailer vehicle 3 is also actually coupled in this case and has not been permanently parked for example in the yard for loading, a plausibility check can take place after travel begins in order to ascertain whether the tire sensor modules $6.i$ having the detected trailer designation B are still available, i.e. these tire sensor modules $6.i$ are then also in the travelling state.

In addition, a sixth step 606 involves checking whether the sensor identifications ID.i most recently stored on the control unit 4, i.e. tire sensor modules $6.i$ associated with the most recently attached trailer vehicle 3, continue to be detected. This involves checking whether just data messages S1 that transmit the stored sensor identification ID.i are received. Additionally, a check is performed to ascertain whether sensor identifications ID.i have been received from tire sensor modules $6.i$ from all stored wheel positions R.i. If there are otherwise no discrepancies in the received and stored axle configurations AKonf, wheel positions R.i and trailer designation B, all tire sensor modules $6.i$ are accepted and the trailer vehicle 3 remains detected. Therefore, the sixth step 606 differs from the fifth step 605 merely in that additionally the information stored on the control unit 4 is used. In order to perform a plausibility check again in this case too to ascertain that the trailer vehicle 3 is attached, the start of the journey can be followed by a check being performed to ascertain whether data messages S1 continue to be received from the applicable tire sensor modules $6.i$, i.e. these tire sensor modules $6.i$ are then also in the travelling state.

A seventh step 607 can furthermore involve checking whether just one trailer designation B has been buffer-stored up until then and the number of buffer-stored sensor identifications ID.i, i.e. of the detected tire sensor modules $6.i$, is greater than half of the tire sensor modules $6.i$ to be expected on the basis of the trailer axle configuration AKonf. This is the case for the driver's own trailer vehicle 3 shown in FIG. 1 if at least three of the four tire sensor modules $6.i$ have been detected. The extended trailer detection has then concluded and the driver's own trailer vehicle 3 has been taught, and an appropriate output of the status signals S2 and a display on the basis of a fixed position can be effected.

Display of tire states and tire sensor module states is then initially effected merely on the basis of the detected tire sensor modules $6.i$. In the background, tire sensor modules are furthermore detected and, if they match the driver's own trailer vehicle 3, i.e. the trailer designation B, the trailer axle configuration AKonf and the tire positions R.i are consistent, and no other inconsistencies arise, display of tire states and tire sensor module states is also effected for these tire sensor modules $6.i$.

Furthermore, an eighth step 608 can involve checking whether, in the case of two different trailer designations B, the number of detected tire sensor modules $6.i$ for one trailer designation, e.g. B="A1", is the same as the tire sensor modules $6.i$ that can be expected on the basis of the trailer axle configuration AKonf, and, at the same time, for the second trailer designation, e.g. B="A3", the number of detected tire sensor modules $6.i$ is less than a limit percentage per_th of for example 40% of the tire sensor modules $206.i$ to be expected on the basis of the trailer axle configuration AKonf. This corresponds to the situation in FIG. 1 when all the driver's own tire sensor modules $6.i$ have been detected and just one tire sensor module 206.3 from the right-hand trailer vehicle 203 is in the monitoring region 8. In that case, the driver's own trailer vehicle 3 has been taught, and an appropriate output of the status signals S2 and a display on the basis of a fixed position can be effected.

In this case, the tire sensor modules $6.i$ having the one associated trailer designation B="A1" are associated with the driver's own trailer vehicle 3, and the tire sensor modules $206.i$ having the other trailer designation B="A3" are erased from the buffer store. Therefore, display of all tire sensor modules $6.i$ of the driver's own trailer vehicle 3 can take place.

Therefore, when the cited criteria in steps 605 to 608 are satisfied, in some exceptional cases the extended trailer detection can be concluded early and a display of the applicable information to the driver can be effected earlier by virtue of the subsequent steps 609 to 614 being visited according to an optional embodiment. The branches shown in dashes in FIG. 5 are therefore merely an optional resort. The individual checks in steps 605 to 608 can be effected in a variable order in this case. This can be achieved for example by virtue of different maximum counters counter_max being assumed for the individual steps 605 to 608 and accordingly the fourth step 604 being reached earlier or later for different checks. As such, each check can be provided with sufficient time to deliver a safe result for a fast trailer detection.

If a plausibility check on the results attained at a standstill is desired after travel begins or if the checks at a standstill have not been able to be concluded positively, e.g. because the same amount as or more than the limit percentage per_th of 40% of the approved tire sensor modules $106.i$ have been detected for one of the trailer designations B, e.g. B="A2", i.e. for the left-hand trailer vehicle 103 in FIG. 1, because there are more than two trailer designations B or because the maximum counter counter_max has not been reached at a standstill, a final rating takes place only in the subsequent travelling state. A final rating while travelling can alternatively be provided for when, according to an optional embodiment, the positively concluded checks in steps 605 to 608 are meant to have plausibility checks performed for them, i.e. the optional resort via the dashed lines in FIG. 5 is not chosen.

If, accordingly, it has not been possible, at a standstill, to detect a trailer vehicle 3, 103, 203 as belonging to the driver's own vehicle/trailer combination 1, if a plausibility check on the results attained at a standstill is supposed to take place or if the applicable maximum counter counter_max for no detected tire sensor module 6.i, 106.i, 206.i has been reached, i.e. a rating has not yet been started, then, as soon as the vehicle/trailer combination 1 begins to move, a ninth step 609 now involves only tire sensor modules 6.i, 106.i, 206.i that likewise move being taken into consideration. In parallel therewith, the simple trailer detection described above in FIG. 3 begins from step 400 merely on the basis of the wheel position R.i and also the trailer axle configuration AKonf and without taking into consideration the trailer designation B.

For all received data messages S1 of a particular sensor identification ID.i, a tenth step 610 now involves the travel counter counter_d_ID.i being incremented starting at one and, furthermore, the trailer designation B, the wheel position R.i and also the trailer axle configuration AKonf being buffer-stored on the control unit 4.

A rating in the travelling state now takes place as follows, for example:

After the travel counter counter_d_ID.i has reached a minimum number count min of, for example, two for at least one sensor identification ID in an eleventh step 611, all buffer-stored data relating to tire sensor modules 6.i, 106.i, 206.i whose trailer designation B is no longer detected in the travelling state are erased from the buffer store of the control unit 4. After that, all standstill counters counter_p_ID.i still in the buffer store are added to the travel counter counter_d_ID.i, which has the same sensor identification ID.i and which can possibly also be zero, if no data messages S1 have been received from these tire sensor modules 6.i, 106.i, 206.i yet while travelling. From this time onward, only the travel counters counter_d_ID.i are now used and rated. This allows the speed of the extended trailer detection to be increased, since counting does not begin at one and therefore, even for the driver's own trailer vehicle 3, which would then be counted twice, there is no starting from the beginning.

A twelfth step 612 then involves checking whether, after the minimum number count min is reached and after the standstill counter counter_p_ID.i is added to the travel counter counter_d_ID.i, the maximum counter counter_max has been reached. In this case, in a thirteenth step 613, a rating of the buffer-stored data, i.e. the trailer designation B, the wheel positions R.i and the trailer axle configuration AKonf, takes place. The check on the minimum number count min ensures that, even after travel begins, data messages S1 are still captured and can be incorporated into the rating as well. That is to say that a rating takes place not immediately after travel begins, for example because the maximum counter counter_max has already been reached at a standstill, but rather only after further data messages S1 are received while travelling.

As a result, it is also possible to rule out the case in which consistent data have been able to be ascertained for each of two or more different trailer designations B at a standstill using the data message S1 and the trailer vehicles 3, 103, 203 have set off at the same time. It is then possible to detect over a lengthy period whether the adjacent trailer vehicles 103, 203 actually move away from one another, and thus the driver's own trailer vehicle 3 can be detected.

The rating while travelling corresponds substantially to steps 604 to 608 in this case, with the difference that the rating is now merely limited to moving tire sensor modules 6.i, 106.i, 206.i. Depending on the result of the rating, the applicable tire sensor modules 6.i are accepted and the extended trailer detection has concluded, which means that the status signal S2 can be output as appropriate with a display to the driver. Thus, a result that has possibly already been ascertained in steps 604 to 608 can be acknowledged or else refuted, and accordingly the extended trailer detection can be concluded or terminated.

Alternatively, the status signal S2 can also be output not on the basis of a fixed position during this time. That is to say that, when critical states are detected by means of one of the data messages S1, an indication is provided that there is a fault on any one of the wheels, possibly even on the adjacent vehicle. The driver himself then needs to identify which wheel is affected.

Additionally, a fourteenth step 614 while travelling can involve checking whether, when the maximum counter counter_max of, for example, 30 is reached for a particular tire sensor module 6.i having a particular trailer designation B, the number of tire sensor modules 6.i having the same trailer designation B that are detected up to then matches the trailer axle configuration AKonf. If this is the case, only the tire sensor modules 6.i having this trailer designation B are presented to the driver on the basis of the trailer axle configuration AKonf. The tire sensor modules 106.i, 206.i having other trailer designations B are ignored, it being assumed that the high maximum counter counter_max and the travelling state mean that these tire sensor modules 6.i have a high level of certainty of belonging to the driver's own trailer vehicle 3. Additionally, for the further tire sensor modules 6.i that have the same trailer designation B, it can be an additional requirement for sufficient data messages S1 to need to be received for these tire sensor modules 6.i too before they are also actually accepted.

If the number of tire sensor modules 6.i having the same trailer designation B that are detected in total up to then is not yet concordant with the number of number of the number tire sensor modules 6.i that is to be expected on the basis of the trailer axle configuration AKonf for this tire sensor module 6.1, the extended trailer detection can nevertheless be concluded. The tire sensor modules 6.i that are still missing are accepted only when data messages S1 from these tire sensor modules 6.i are received in the further course of travel. Up to then, the whole trailer vehicle 3 with its trailer axle configuration AKonf can be presented already and the data of the missing tire sensor modules 6.i are not presented until they are received.

If the extended trailer detection does not deliver a result while travelling either, there is a switch to the simple trailer detection shown in FIG. 3 and accordingly a wait until, without taking into consideration the trailer designation B, tire sensor modules 6.i are detected, possibly on the basis of a fixed position.

Otherwise, after individual tire sensor modules 6.i are accepted, a final, fifteenth step 615 involves the trailer axle configuration AKonf transmitted by the accepted tire sensor modules 6.i and the tire positions R.i being taken into consideration by the control unit 4 when evaluating and displaying tire states p, T, s and/or tire sensor module states.

LIST OF REFERENCE SIGNS 1 commercial vehicle/trailer combination
2 driver's own towing vehicle
3 driver's own trailer vehicle
4 control unit
5 receiving module
6.i tire sensor module on the driver's own trailer vehicle 3
7 coordinate system
8 monitoring region
100 monitoring system
102, 202 adjacent towing vehicles
103, 203 adjacent trailer vehicles 106.i, 206.i tire sensor modules on adjacent trailer vehicles 103, 203
400 to 405 steps of the simple trailer detection
501 to 507 steps of the plausibility check
600 to 615 steps of the extended trailer detection
701, 702, 703 switching steps of the plausibility check
AKonf trailer axle configuration
B trailer designation
count min minimum number
counter_d_ID.i travel counter
counter_p_ID.i standstill counter
counter_max maximum counter
counter_mod number of modules
ID.i sensor identification
K1, K2 coordinates
mod_max maximum number of modules
p tire pressure
per_th limit percentage
R.i wheel position
s mechanical stresses
S1 data message
S2 status signal
T tire temperature
i indices

The invention claimed is:

1. A method for associating tire sensor modules with a trailer vehicle of a commercial-vehicle/trailer combination, the method comprising:
establishing that a tire sensor module is affiliated to a trailer vehicle based on one or more captured data messages (S1) by a control unit;
detecting a wheel position for the tire sensor module;
outputting a tire state for the detected wheel position of the trailer vehicle; and
receiving the one or more captured data messages (S1) and ascertaining a number of captured data messages for the tire sensor module.

2. The method of claim 1, wherein the tire state comprises one or more of pressure, temperature and stress.

3. The method of claim 1, wherein establishing that the tire sensor module is affiliated to the trailer vehicle is based on the ascertained number of captured data messages.

4. The method of claim 1, further comprising coding the wheel position into the one or more captured data messages by the sensor module prior to transmitting the one or more captured data messages.

5. The method of claim 1, wherein the one or more captured data messages include an identification to indicate content being transmitted.

6. The method of claim 1, wherein the one or more captured data messages include a trailer designation.

7. The method of claim 1, wherein the value for the wheel position corresponds to a coordinate pair (K1, K2) in a coordinate system.

8. The method of claim 1, wherein the wheel position and a trailer axle configuration are distributed over multiple data messages (S1) depending on a volume of data.

9. The method of claim 1, wherein accepted tire modules are checked for plausibility, and wherein this involves checking whether one or more of the following conditions apply:
each tire sensor module associated with the driver's own trailer vehicle uses the data message (S1) to also actually transmit a trailer axle configuration;
each tire sensor module associated with the driver's own trailer vehicle transmits the same trailer axle configuration;
a number of modules for tire sensor modules associated with the driver's own trailer vehicle is less than or equal to the number of tire sensor modules to be expected according to the trailer axle configuration;
each tire sensor module associated with the driver's own trailer vehicle uses the data message (S1) to also actually transmit a wheel position;
each tire sensor module associated with the driver's own trailer vehicle transmits a different wheel position; or,
all wheel positions to be expected according to the trailer axle configuration are transmitted by the tire sensor modules.

10. The method of claim 1, wherein:
if individual tire sensor modules associated with the driver's own trailer vehicle transmit no trailer axle configuration and/or different trailer axle configurations using the data message (S1),
then a trailer axle configuration is assumed to be reliable and is adopted for the driver's own trailer vehicle if at least a maximum number of modules for tire sensor modules transmit the same trailer axle configuration, wherein the maximum number of modules corresponds to a proportion of the number of modules, for example half the number of modules, and the positional association of all tire sensor modules is erased and an optional error message is output, if fewer than the maximum number of modules for tire sensor modules transmit the same trailer axle configuration.

11. A system for associating tire sensor modules with a trailer vehicle, the system comprising:
a receiving module configured to receive a plurality of data messages from a tire sensor module of a trailer vehicle; and
a control unit of a towing vehicle configured to determine an amount of the plurality of data messages and establish that the tire sensor module is affiliated to the trailer vehicle based on the amount.

12. The system of claim 11, wherein the receiving module is arranged at a rear of the towing vehicle.

13. The system of claim 11, wherein the towing vehicle is a truck and the trailer vehicle is a tow-axle trailer.

14. The system of claim 11, wherein the control unit is further configured to determine an axle position based on the plurality of data messages.

15. The system of claim 11, wherein the control unit is configured to determine a tire state based on the plurality of data messages.

16. The system of claim 11, wherein the receiving module is configured to receive a second plurality of data messages from a second sensor module.

17. The system of claim 11, wherein the tire sensor module is configured to output a sensor identification and wheel position as part of the plurality of data messages.

18. The system of claim 11, wherein the tire sensor module is configured to code a trailer designation B into the plurality of data messages.

* * * * *